(12) United States Patent  
Sako

(10) Patent No.: US 6,357,542 B1
(45) Date of Patent: Mar. 19, 2002

(54) ARTICLE STORAGE AREA FOR MOTORCYCLES

(75) Inventor: Hiroyuki Sako, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/539,383

(22) Filed: Mar. 31, 2000

(30) Foreign Application Priority Data

Mar. 31, 1999 (JP) .......................................... 11-090806

(51) Int. Cl.[7] .............................................. B60R 16/04
(52) U.S. Cl. ...................... 180/68.5; 180/219; 224/413; 296/37.1
(58) Field of Search ................................ 224/425, 426, 224/433, 442, 445, 446, 402, 409, 412, 413, 400, 411, 428, 42.15, 42.32, 42.33, 42.38, 404; 180/219, 220, 68.5, 89.11; 296/37.1, 37.6, 37.8; 280/47.35; 220/533, 501, 528, 529

(56) References Cited

U.S. PATENT DOCUMENTS

| 3,554,311 | A | * | 1/1971 | Thompson | .................. 180/219 |
| 3,944,009 | A | * | 3/1976 | Katagiri | ...................... 180/219 |
| 4,384,663 | A | * | 5/1983 | Smith-Williams | ........ 224/42.33 |
| 4,660,880 | A | * | 4/1987 | Bensch | ...................... 296/37.1 |
| 4,789,195 | A | * | 12/1988 | Fletcher | .................. 296/37.1 X |
| 4,802,682 | A | * | 2/1989 | Yasuji | ......................... 180/219 |
| 4,884,733 | A | * | 12/1989 | Geeves | ........................ 224/433 |
| 5,044,646 | A | * | 9/1991 | Iiga et al. | .................... 180/219 |
| 5,054,668 | A | * | 10/1991 | Ricchiuti | ..................... 224/433 |
| 5,060,748 | A | * | 10/1991 | Iwai et al. | ............. 296/37.1 X |
| 5,513,721 | A | * | 5/1996 | Ogawa et al. | .............. 180/220 |
| 5,657,916 | A | * | 8/1997 | Tackett | ....................... 224/404 |
| 5,823,598 | A | * | 10/1998 | Clare et al. | ................ 296/37.6 |
| 6,073,719 | A | * | 6/2000 | Ohmika et al. | ............. 180/219 |

FOREIGN PATENT DOCUMENTS

| JP | 4287782 | 10/1992 |
| JP | 2756795 | 3/1998 |
| JP | 10147273 | 6/1998 |

* cited by examiner

Primary Examiner—Brian L. Johnson
Assistant Examiner—Bryan Fischmann
(74) Attorney, Agent, or Firm—Birch, Stewart, Kolasch & Birch, LLP

(57) ABSTRACT

Disclosed is an article storage box attachable to a vehicle having a front storage chamber and a rear storage chamber arranged in tandem. The storage box also includes a partition positioned between the storage chambers and defined by inner walls of the article storage box, wherein the partition has an accessible interior recess being capable of receiving and securably facilitating an accessory such as a helmet.

3 Claims, 6 Drawing Sheets

ARTICLE STORAGE AREA FOR MOTORCYCLES

BACKGROUND OF THE INVENTION

1. Field of the Invention

The present invention relates to an article storage device in a motorcycle such as a scooter or the like.

2. Background Art

Heretofore, there is known a motorcycle, particularly a scooter-type motorcycle for carrying two persons, having an article storage box of a large volume disposed underneath a longitudinally long tandem seat for storing two helmets therein (see Official Gazette No. 2756795).

In the known motorcycle, because the article storage box occupies much of a limited space below the seat, an installation position for an accessory such as a battery or the like is limited and forced to be placed far from the center of gravity of the body of the motorcycle. However, because the accessory such as a battery or the like is relatively heavy, when it is installed away from the center of gravity of the body of the motorcycle, it tends to bring the motorcycle out of weight balance. Additionally, in this location, the accessory cannot easily be serviced for maintenance.

If the accessory is positioned near the center of gravity of the body of the motorcycle, then the article storage box suffers another problem in that the storage space in the article storage box is reduced.

SUMMARY OF THE INVENTION

It is an object of the present invention to provide a novel article storage device in a motorcycle, which has a sufficient storage space and allows an accessory such as a battery or the like to be installed near the center of gravity of the body of the motorcycle, for thereby solving the above problems.

To achieve the above object, there is provided an article storage device in a motorcycle having an article storage box underneath a seat for a passenger to be seated thereon, characterized in that the article storage box has a front storage chamber and a rear storage chamber that are arranged in tandem, with a division space defined between these storage chambers by walls of the article storage box and extending as a recess into the article storage box, and an accessory such as a battery or the like is disposed in the division space. With the above features, the article storage box has a sufficient storage capacity, and the accessory such as a battery or the like, which is a heavy component, can be installed in an intermediate region of the body of the motorcycle, thereby bringing the motorcycle in good weight balance.

To achieve the above object, there is further provided a window communicating with the division space defined in one of the walls of the article storage box for taking the accessory into and out of the article storage box via the window. With these features, in addition to the advantages offered by the invention according to claim 1, the accessory can be taken into and out of the division space through the window thus provided in the article storage box with ease.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
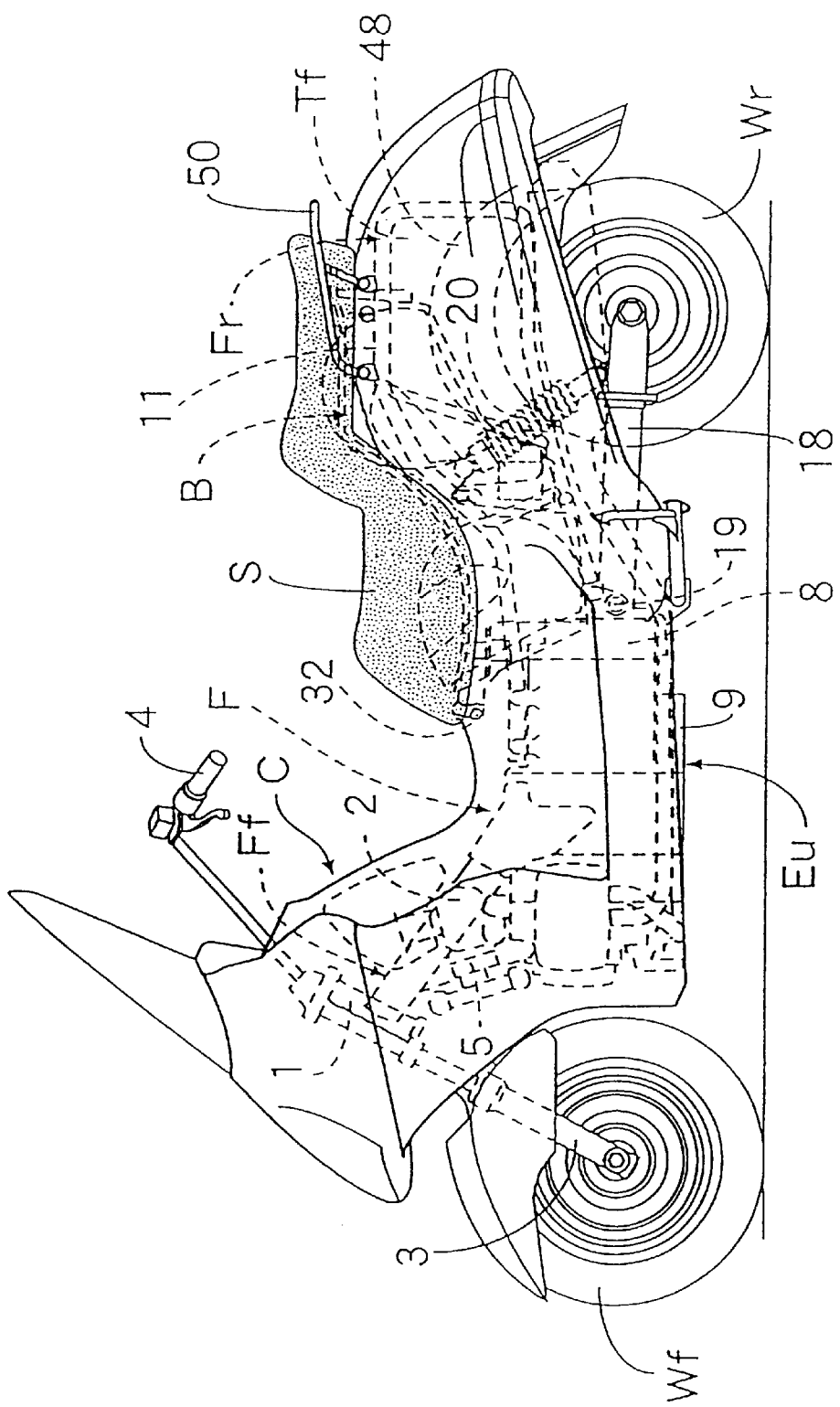
FIG. 1 is a side elevational view of a scooter-type motorcycle which has an article storage device according to an embodiment of the present invention.

The present invention will hereafter be described below with reference to an embodiment shown in the drawings.

An embodiment in which the present invention is applied to a scooter-type motorcycle, which will be described below with reference to FIGS. 1 through 6. However, the present invention is not limited to the vehicle shown in the embodiment. For example, the embodiment may be implemented on vehicles other than those with two wheels, e.g., those with three or more.

The terms "upper" and "lower", "left" and "right", and "front" and "rear" will be used herein with respect to the direction of travel of the motorcycle.

Figure 2:
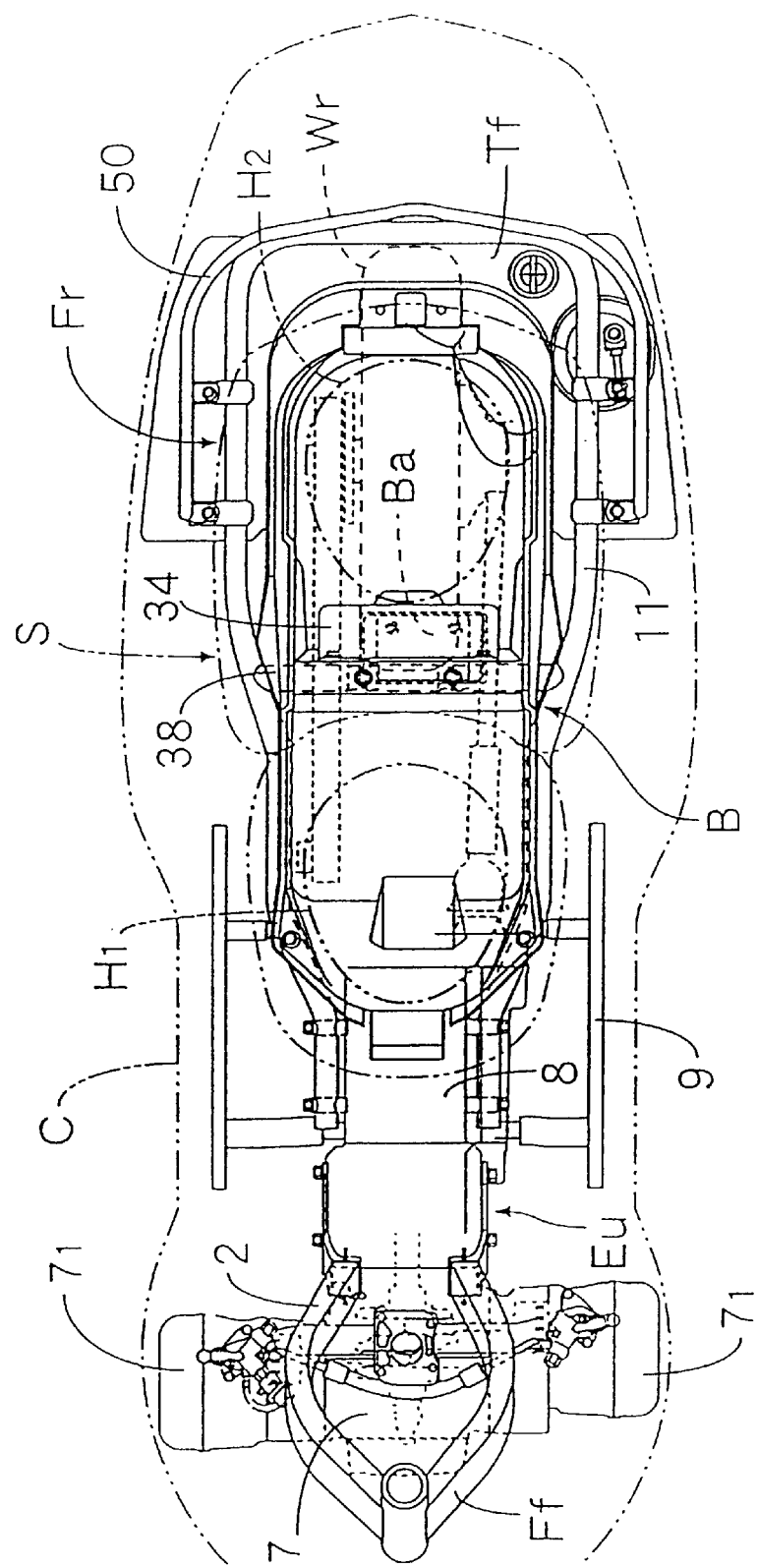
FIG. 2 is a plan view of the motorcycle shown in FIG. 1 with a motorcycle body cover and a seat being omitted from illustration.

As illustrated in FIGS. 1 and 2, a body frame F which serves as the framework of a motorcycle comprises a front frame Ff, an engine unit Eu for propelling the motorcycle, and a rear frame Fr which are integrally joined together. The front frame Ff includes a head pipe 1 and a bifurcated main pipe 2 extending integrally therefrom in rearward and downward directions. On the head pipe 1, there is steerably supported a front fork 3 with a front wheel Wf mounted on a lower end thereof by a shaft. A steering handle 4 is fixed to the upper end of the front fork 3. The engine unit Eu has an upper portion fixed to the lower end of the main pipe 1 and the lower end of a support frame 5 which extends downwardly from the main pipe 1. The engine unit Eu has a front portion suspended from the front frame Ff. The engine unit Eu has a horizontally opposed engine 7 in its front portion. The engine 7 has a pair of cylinders $7_1$ extending substantially horizontally in left and right outward directions. The engine unit Eu also has a transmission 8 in its rear portion that is suspended from the rear frame Fr.

The rear frame Fr is in the form of an upwardly and downwardly open frame comprising a rear pipe 10, a seat rail 11 disposed above the rear pipe 10, and a plurality of joint pipes 12 integrally interconnecting the rear pipe 10 and the seat rail 11. An article storage box B for storing an article such as a helmet or the like, described hereinafter, is disposed in the rear frame Fr. The rear pipe 10 has a front end integrally coupled to opposite sides of a rear end of the transmission 8 of the engine unit Eu by joint bolts 13, and extends upwardly towards the rearward direction. The seat rail 11 has opposite left and right ends integrally coupled to left and right upper surfaces of the engine unit Eu by joint bolts 14, and extends rearwardly above the rear pipe 10. The rear pipe 10 and the seat rail 11 have respective intermediate portions integrally joined to each other by the plurality of joint pipes 12. The rear pipe 10 and the seat rail 11 have respective rear ends integrally joined together.

Most of the body frame F which is constructed of the front frame Fr, the engine unit Eu, and the rear frame Fr is covered with a monocoque body cover C, which is made of synthetic resin or metal plate.

A swing arm 18 is vertically swingably supported on a lower portion of the transmission 8, in the rear portion of the engine unit Eu, by a pivot shaft 19. A rear wheel Wr is rotatably mounted on the rear end of the swing arm 18. A pair of left and right rear cushions 20 are coupled between the swing arm 18 and the rear frame Fr. The swing arm 18 houses a known power transmitting mechanism (not shown) for transmitting the power of the engine unit Eu to the rear wheel Wr. A foot rest frame 9 projecting laterally is fixed to a lower portion of the engine unit Eu.

The rear frame Fr which is constructed of the rear pipe 10, the seat rail 11, and the joint pipes 12 has an open space defined upwardly and downwardly therein above the rear wheel Wr. The space accommodates an article storage box B disposed between the left and right rear cushions 20 for storing articles such as helmets or the like. The article storage box B is supported on the seat rail 11 of the rear frame Fr, as described hereinafter.

Structural details of the article storage box B according to this embodiment will be described below.

Figure 3:
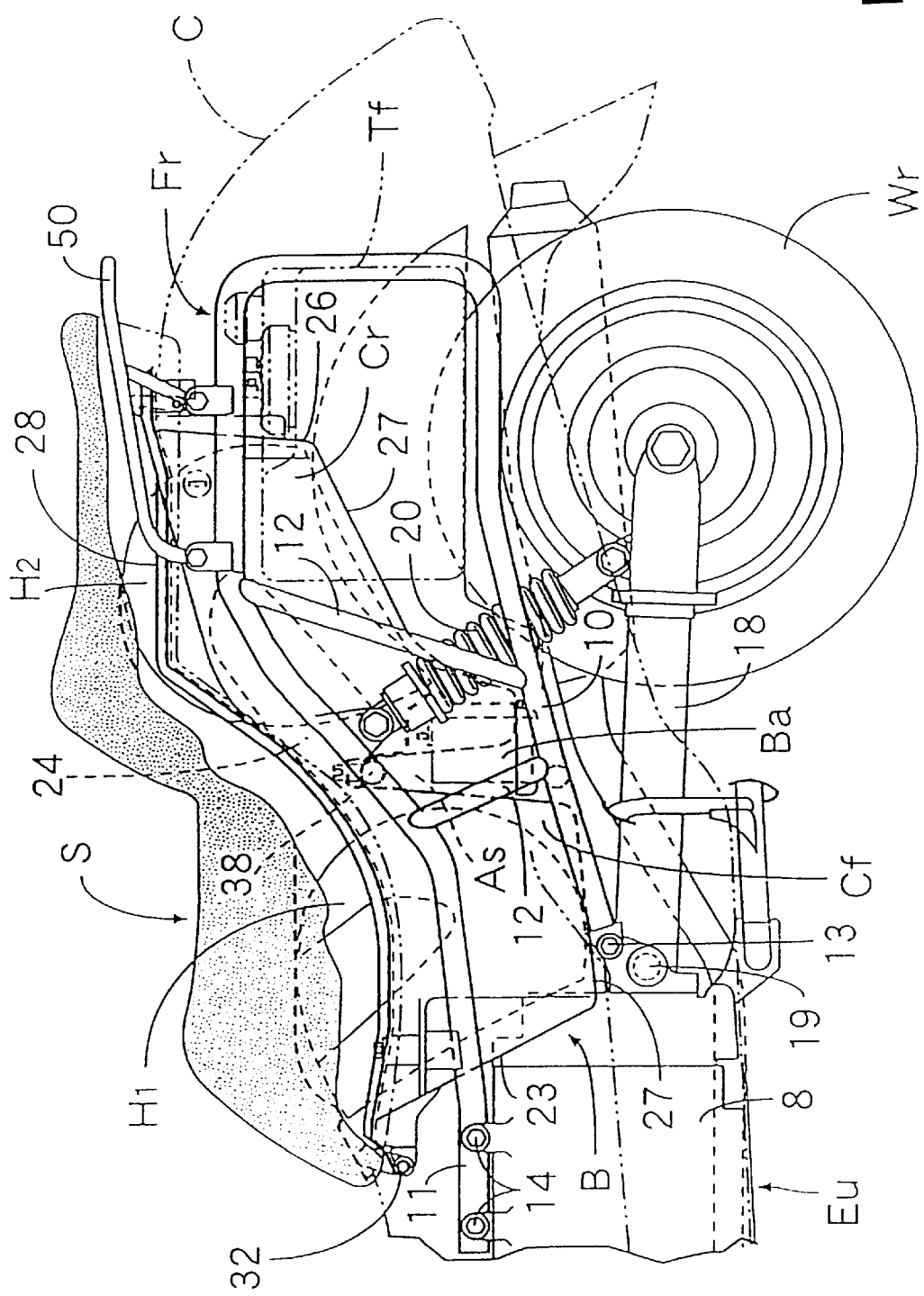
FIG. 3 is a partial cross sectional side elevational view of a rear portion of the motorcycle shown in FIG. 1 with a motorcycle body cover being omitted from illustration.

As illustrated in FIG. 3, the article storage box B is a longitudinally long rectangular shape, and comprises a front wall 23, left and right side walls 24, 25, a rear wall 26, and a bottom wall 27, each made of a metal plate or a synthetic resin plate. The article storage box B has an inlet/output opening 28 defined in its upper surface for taking the articles into and out of the article storage box B therethrough. The article storage box B has a front storage chamber Cf defined in a front portion thereof for storing a helmet $H_1$ and a rear storage chamber Cr defined in a rear portion thereof for storing another helmet $H_2$, the front and rear storage chambers Cf, Cr being arranged longitudinally in tandem. The article storage box B also has a division space As defined in a longitudinally intermediate portion thereof and extending across and dividing the front and rear storage chambers Cf, Cr from each other. The division space As extends as a recess from the bottom wall 27 into the article storage box B.

Figure 4:
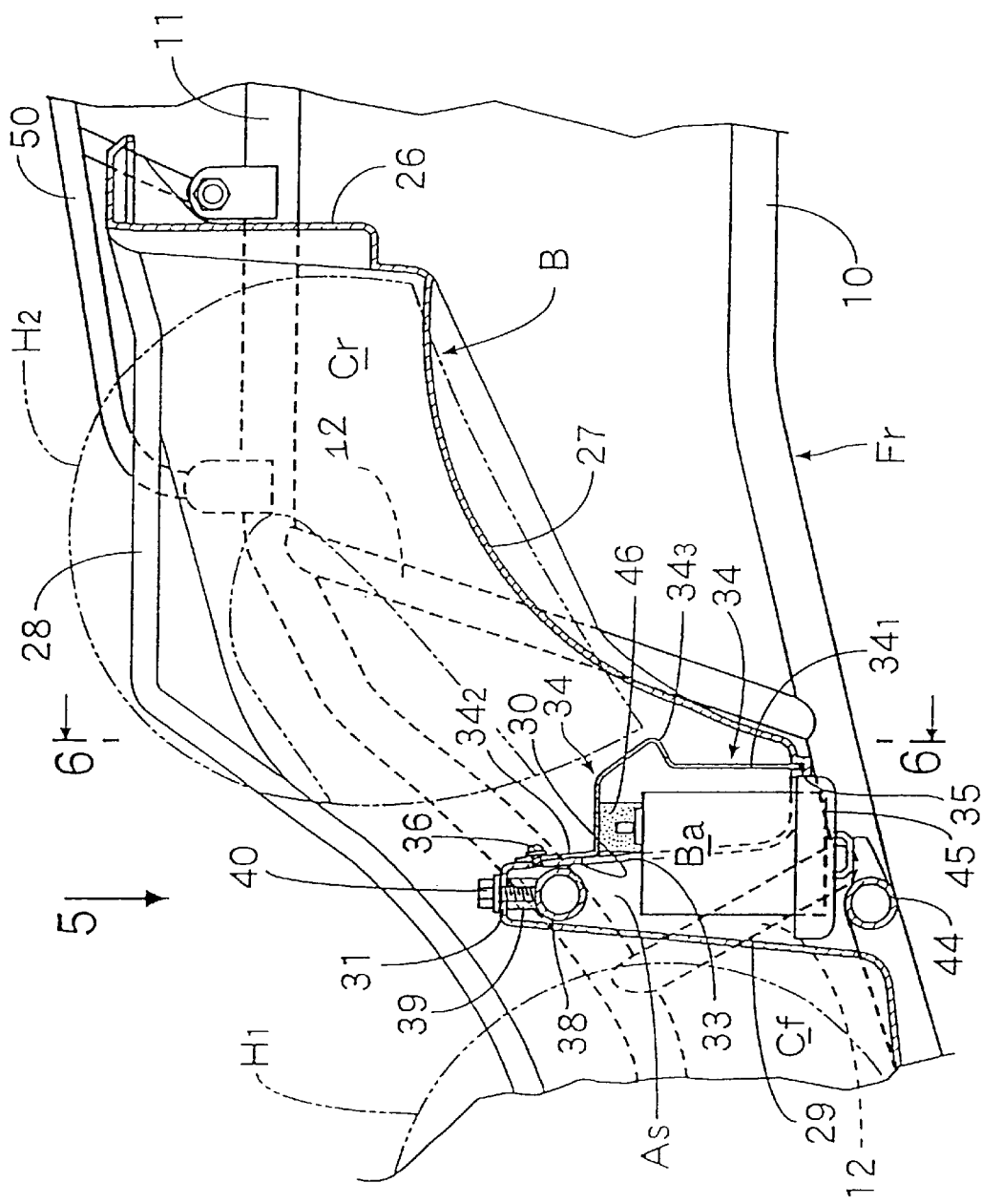
FIG. 4 is a vertical cross sectional view of an essential portion of the article storage device.

As best shown in FIG. 4, the division space As is shaped as a tunnel extending transversely through the longitudinally intermediate portion of the article storage box B, and has an inverted U shape as viewed in side elevation, with a certain width in the longitudinal direction. The division space As is defined by a rear wall 29 of the front storage chamber Cf, a front wall 30 of the rear storage chamber Cr, and a substantially horizontal upper wall 31 interconnecting the upper ends of the walls 29, 30. The upper wall 31 of the division space As extends to a position near the inlet/outlet opening 28 of the article storage box B.

The rear surface of the division space As, i.e., the front wall 30 of the rear storage chamber Cr, has a window 33 defined in an intermediate portion thereof and extends to the bottom wall 27 of the article storage box B. The window 33 provides communication between the division space As and the rear storage chamber Cr. The window 33 is covered with a cover wall 34 which is part of the front wall 30 of the rear storage chamber Cr.

Figure 5:
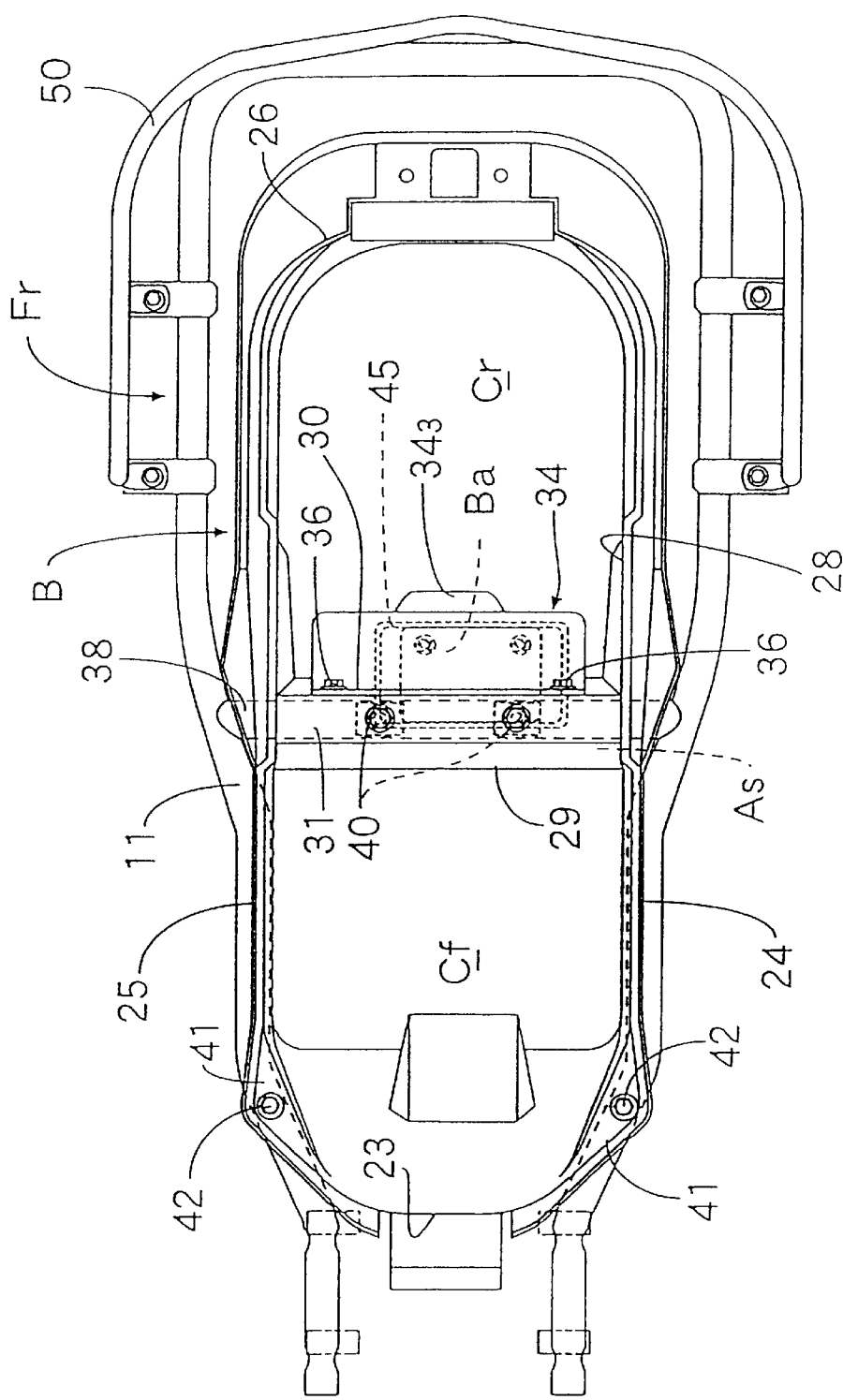
FIG. 5 is a plan view as viewed along the arrow 5 in FIG. 4.
Figure 6:
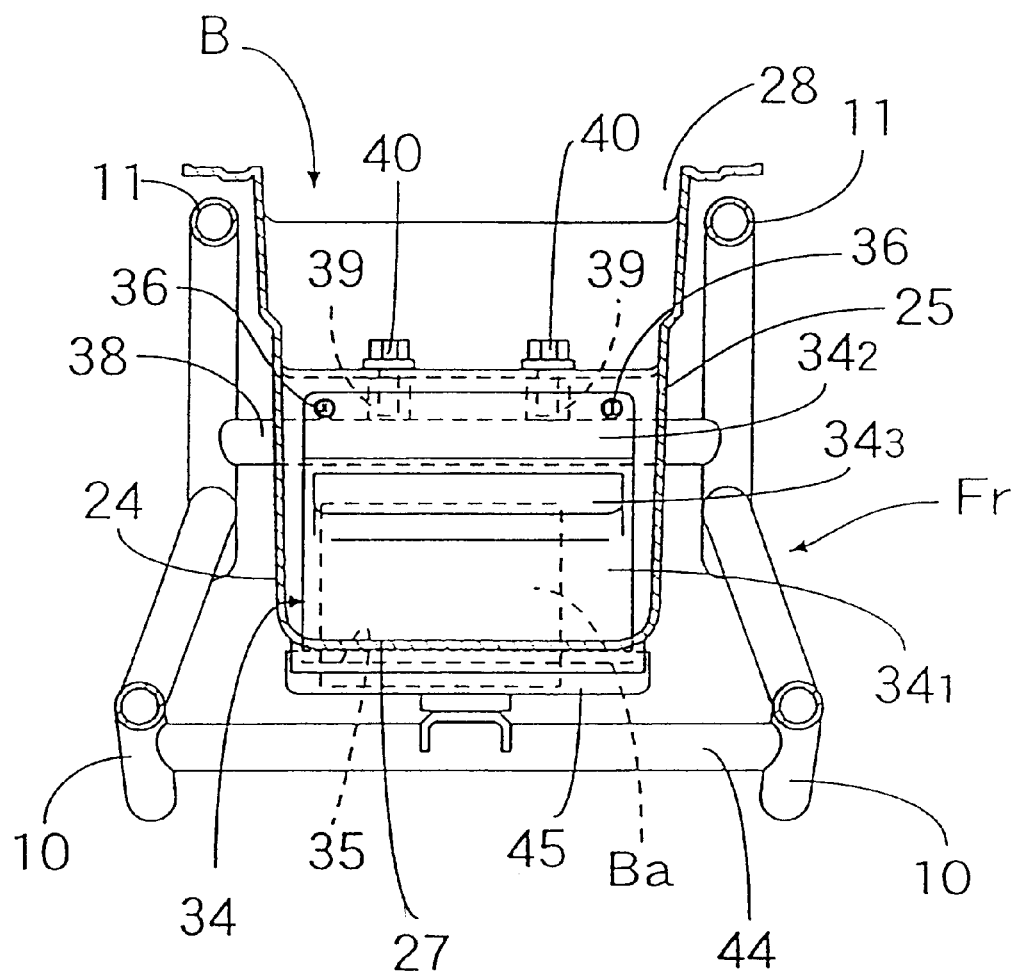
FIG. 6 is a vertical cross sectional view taken along line 6—6 of FIG. 4.

As illustrated in FIGS. 4 and 5, the cover wall 34 has a step portion in its vertical cross section, thereby increasing the volume of the division space As. The cover wall 34 has an insertion member $34_1$ integral with the lower edge thereof which is removably inserted in an insertion groove 35 defined in the bottom wall 27 of the article storage box B. The cover wall 34 also has an attachment flange $34_2$ extending upwardly from its upper edge. After the insertion member $34_1$ is inserted into the insertion groove 35, the attachment flange $34_2$ is fixed to the front wall 30 of the rear storage chamber Cr by mounting screws 36, thereby closing the window 33. The cover wall 34 has a grip $34_3$ integrally formed with an upper portion thereof and projecting as a triangular cross sectional shape in the rearward direction. The grip $34_3$ can be gripped for attaching and removing the cover wall 34. The grip $34_3$ also serves as a surface for receiving a jaw region of the helmet $H_2$ stored in the rear storage chamber Cr.

Referring to FIG. 4, a cross pipe 38 integral with the seat rail 11 extends through the upper portion of the division space As. The upper wall 31 of the division space As is supported on the cross pipe 38. A plurality of attachment bosses 39 are fixed to the cross pipe 38 at intervals spaced in the longitudinal direction of the cross pipe 38. Attachment bolts 40 are fastened to the attachment bosses 39 through the upper wall 31 of the division space As, and support the longitudinally intermediate portion of the article storage box B on the seat rail 11.

As illustrated in FIG. 5, the article storage box B has left and right front portions fixed to and supported on the seat rail 11 by attachment bolts 42 threaded through respective attachment members 41 formed integrally with those left and right front portions.

Referring again to FIG. 4, a tray 45 is integrally supported on the cross pipe 44, which is integral with the rear pipe 10 between the left and right rear cushions 20 below the division space As. The tray 45 can support thereon an electric component such as a battery Ba which has been introduced from the article storage box B through the window 33 into the division space As. When the window 33 is closed by the cover wall 34, the battery Ba on the tray 45 can be held in position with a damper 46 mounted either on an inner surface of the cover wall 34 or on an upper surface of the battery Ba serving as a cushion. The battery Ba, which is a heavy object, can thus be supported on the rear frame Fr in the longitudinally intermediate portion of the article storage box B which is longitudinally long, and between the left and right rear cushion 20. The battery Ba thus positioned holds the overall motorcycle in good weight balance.

The tray 45 also serves as an inner fender for covering the lower opening of the division space As to protect the battery Ba against mud and splashes.

An arched tire house 48 (see FIG. 1) is formed on a laterally intermediate portion of the bottom wall 27 of the rear storage chamber Cr of the article storage box B and extends longitudinally toward the article storage box B. The rear wheel Wr (see FIG. 3) has an upper surface faced with the tire house 48. The tire house 48 allows the article storage box B to be positioned near the rear wheel Wr.

Referring to FIG. 3, above the article storage box B, a longitudinally long tandem seat S for two persons to be seated thereon has a front portion angularly movably supported on the seat rail 11 by a hinge shaft 32. The tandem seat S can be opened and closed rearwardly about the hinge shaft 32. An upper surface of the body cover C right below the tandem seat S has through opening. When the tandem seat S is closed, the tandem seat S closes the inlet/outlet opening 28 of the article storage box B.

Operation of the preferred embodiment of the present invention will be described below.

When the seat S is angularly opened to open the inlet/outlet opening 28 of the article storage box B, the helmet $H_1$ and other articles can be stored in the front storage chamber Cf, and the other helmet $H_2$ and the other articles can be stored in the rear storage chamber Cr. The jaw region of the helmet $H_2$ can be received by the surface of the grip $34_3$ of the cover wall 34. Even though the article storage box B is formed longitudinally long, the rear wall 29 and the front wall 30, which define the division space As, can hold the articles such as the helmets $H_1$, $H_2$ in the storage chambers Cf, Cr against wobbling movement.

When the cover wall 34 is removed, the window 33 is opened, allowing the division space As to communicate with the article storage box B. Therefore, the electronic component such as the battery Ba or another accessory can be introduced from the article storage box B through the window 33 into the division space As, and placed on the tray 45. With the battery Ba, which is a heavy object, being placed in the division space As in the longitudinally intermediate portion of the article storage box B, the overall motorcycle is brought in good weight balance, while at the same time the article storage box B provides a sufficient storage capacity.

The battery Ba on the tray 45 in the division space As can be removed from the window 33 through the article storage box B. If the window 33 that is open into the article storage box B is extended over the left and right side walls 24, 25 so that the upper ends of the left and right rear cushions 20 face the window 33, maintenance works for adjusting the attachment areas on the upper ends of the left and right rear cushions 20, etc. can easily be performed from the article storage box B side through the window 33.

Denoted at Tf is a fuel tank mounted on a rear portion of the rear pipe 10, and 50 is a grip fixed to a rear portion of the seat rail 11.

While the embodiment of the present invention has been described above, the present invention is not limited to the embodiment, and can be modified within the scope thereof. For example, while the storage device comprising the article storage box is applied to the scooter-type motorcycle in the above embodiment, the storage device can be applied to another motorcycle such as a riding-type motorcycle. The division space can also store other electric components or accessories than the battery The seat may comprise front and rear seats that are longitudinally divided. The engine of the engine unit may be of a type other than the horizontally opposed engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle having an article storage box disposed thereon, the vehicle having a body assembly constituted by a front frame having a propulsion unit and at least one wheel attached thereto, and a rear frame having a seat member and at least one wheel attached thereto, said article storage box comprising:

a front wall;

a rear wall;

first and second side walls respectively attached to said front and rear walls;

a bottom wall attached to said front, rear and first and second sidewalls; and a partition positioned at substantially an intermediate position of an interior space of said article storage box, wherein said partition is defined by two substantially vertical rising wall portions of said bottom wall and a substantially horizontal upper wall part integrally attached to an upper edge of each vertical rising wall, and wherein one of said two substantially vertical rising walls includes an accessible window defined therein, and the article storage box further includes a removable cover member for covering said accessible window, said cover having a stepped portion defined therein and an oblique part extending from said stepped portion.

2. A vehicle having an article storage box disposed thereon, the vehicle having a body assembly constituted by a front frame having a propulsion unit and at least one wheel attached thereto, and a rear frame having a seat member and at least one wheel attached thereto, said article storage box comprising:

a front wall;

a rear wall;

first and second side walls respectively attached to said front and rear walls;

a bottom wall attached to said front, rear and first and second side walls; and a partition positioned at substantially an intermediate position of an interior space of said article storage box, wherein said partition is defined by two substantially vertical rising wall portions of said bottom wall and a substantially horizontal upper wall part integrally attached to an upper edge of each vertical rising wall, and a holding member supportably mounted to the rear frame and positioned between said two substantially vertical rising wall portions and below said substantially horizontal upper wall part.

3. The vehicle according to claim 2, wherein said holding member is for receiving an accessory or a battery.

* * * * *